Sept. 22, 1959 M. W. P. STRANDBERG 2,905,902
MICROWAVE FREQUENCY DISCRIMINATOR
Filed Aug. 12, 1957 2 Sheets-Sheet 1
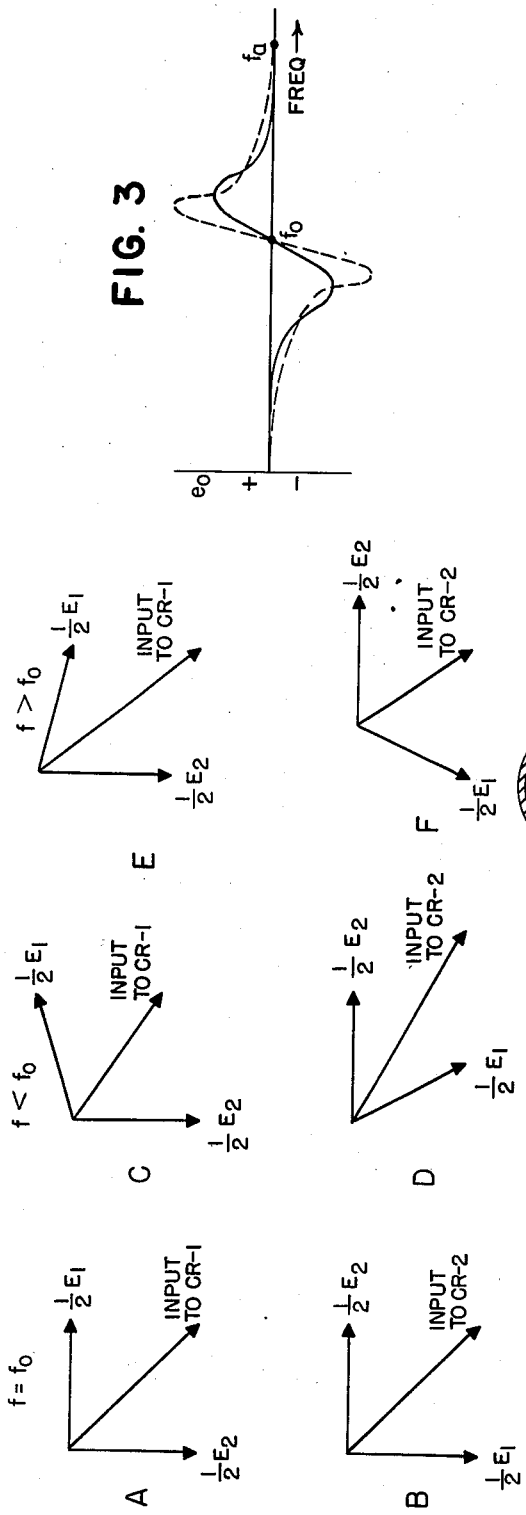
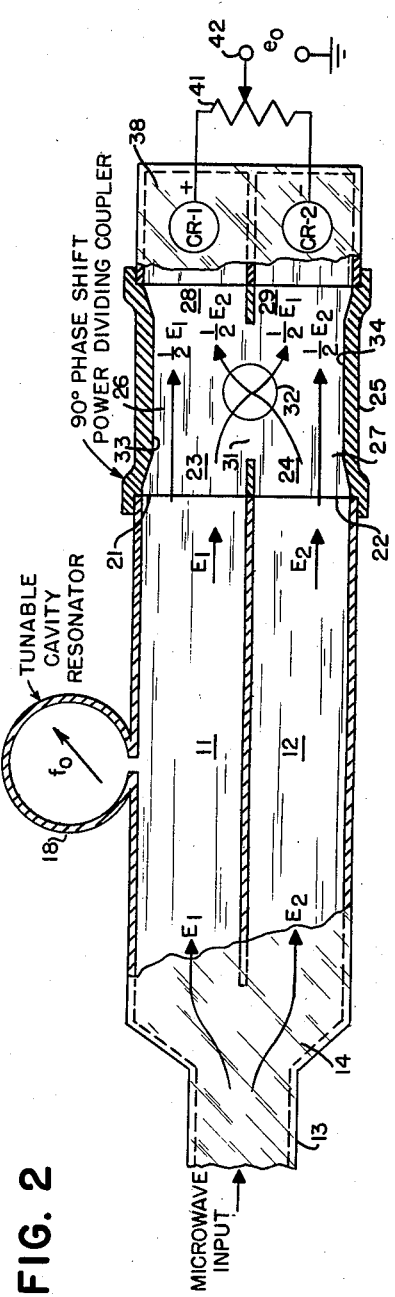
INVENTOR.
MALCOLM W. P. STRANDBERG
BY
Joseph Weingarten
ATTORNEY Sept. 22, 1959  M. W. P. STRANDBERG  2,905,902
MICROWAVE FREQUENCY DISCRIMINATOR
Filed Aug. 12, 1957  2 Sheets-Sheet 2

INVENTOR.
MALCOLM W. P. STRANDBERG
BY
Joseph Weingarten
ATTORNEY

United States Patent Office 2,905,902
Patented Sept. 22, 1959

2,905,902

MICROWAVE FREQUENCY DISCRIMINATOR

Malcolm W. P. Strandberg, Marshfield Hills, Mass.

Application August 12, 1957, Serial No. 677,539

16 Claims. (Cl. 331—9)

The present invention relates in general to frequency sensitive microwave transmission apparatus, and more particularly concerns an intrinsically balanced microwave discriminator providing an electrical signal proportional to the frequency deviation of a microwave input from the frequency of a precision reference, as for example, a tunable cavity resonator.

Frequency discriminators of various designs are of course well known in the art, an early circuit configuration being disclosed in Patent 2,041,855 which issued in 1936. An improved form of the radio frequency discriminator is the Foster-Seeley circuit, which has been extensively used for the detection of frequency modulated radio transmissions. Broadly speaking, these circuits embody the now customary technique of dividing the incident radiation whose frequency deviation is to be detected into two parallel signal transmission paths having predetermined differential phase shift characteristics. Through the use of a phase sensitive detector, an output dependent upon the relative phase shift, or a frequency discriminator pattern, is obtained. These circuits are termed balanced discriminators because at the point of detection the output of one transmission channel rises while the other falls correspondingly as a function of the magnitude of the phase shift, or frequency deviation.

Alternatively, a discriminator characteristic may be realized by combining two tuned circuits whose resonant frequencies are displaced equally above and below the frequency of reference. If both circuits are simultaneously energized by the input, the difference between the detected excitation in the separate circuits is indicative of frequency deviation from the reference.

Both the phase sensitive and the stagger tuned discriminators have been implemented for use at microwave frequencies. Thus, a microwave phase detector system has been described in a paper by V. C. Rideout, Proc. IRE 35, page 767, August 1947. The circuit proposed by Rideout, however, required phase adjustment in order to achieve the appropriate phase relationship between the signals in the two separate detector channels, one being essentially broad-band, the other a narrow band path whose phase and amplitude transmission characteristics were determined by a high Q resonant cavity. In other words, to successfully operate the Rideout form of phase discriminator at different microwave frequencies, separate phase adjustments were required to maintain the proper discriminator output curve.

Stagger tuned resonances at microwave frequencies are disclosed in Hansen Patent 2,502,456, which illustrates the use of a dual-mode cavity resonator to stabilize the frequency of a microwave source. Such cavities, however, are inherently complex and costly, and as a consequence their application has been limited to specialized equipment forms.

The present invention contemplates and has a primary object the provision of a relatively broad band, readily tunable microwave balanced discriminator of exceedingly simplified lightweight design, which though economical of components, is conveniently adapted to stabilize the frequency of precision microwave oscillators.

Generally speaking, the microwave discriminator of this invention achieves the requisite phase relationships through the geometry of the microwave components embodied therein, and requires absolutely no phase adjustments throughout a relatively broad operating frequency spectrum. A single resonant cavity is utilized, minimizing costs and obviating the design complexity of the stagger tuned circuits.

In one aspect of this invention, the input microwave radiation is divided between two essentially parallel microwave transmission paths which may be in the form of commercial waveguide for the selected band of operation. The tunable reference cavity resonator is closely coupled to one channel, thus introducing a phase shift about zero degrees dependent upon whether the transmitted frequency is above or below resonance. The microwave outputs of both channels are then introduced into a power dividing ninety degree phase shift coupler and the two outputs therefrom are applied to a pair of microwave detectors such as crystal diodes. In the event that the input signal is at resonance, the differential phase shift is zero and the detector outputs are equal. However, if the input signal frequency is above resonance, a phase lag will be introduced, or if below resonance a phase lead, with the result that the inputs to the two detectors will be unequal. With the crystals reversed in polarity and their outputs additively combined, a discriminator output is achieved.

More specifically, the power dividing coupler may be in the form of the well known short-slot hybrid junction which has the characteristic of dividing an input signal and furnishing equal amplitude outputs with a ninety degree differential phase shift. As this characteristic is maintained over an exceedingly broad input spectrum, the discriminator may likewise be tuned between widely separated limits without loss of sensitivity, stability or precision.

It is therefore another object of this invention to provide a microwave discriminator using a ninety degree differential phase shifting power divider to furnish signals characteristic of frequency deviation to a pair of microwave detectors.

Another object of this invention is to embody a coupler, whose phase shift characteristic is substantially independent of frequency over a broad spectrum, in a tunable microwave discriminator.

A further object of this invention is to provide a detector output combining circuit enabling the use of unpaired crystal detectors.

A still further object of the invention is to provide a discriminator transmission channel with a plurality of reference frequency standards to permit the development of specialized discriminator voltages or currents.

Another object of this invention is to provide a stable tunable microwave source utilizing the frequency discriminator techniques herein disclosed.

These and other objects of the present invention will now become apparent from the following detailed specification when taken in connection with the accompanying drawings in which:

Fig. 1 is a diagrammatic illustration, partly in schematic circuit form, of a preferred embodiment of the frequency discriminator constituting the present invention;

Fig. 2 is a set of vector diagrams illustrating the phase relationship of signals transmitted by the apparatus of Fig. 1 for conditions of varying frequency;

Fig. 3 is a graphical representation of discriminator characteristics available from apparatus embodying the concepts of this invention;

Figure 4:
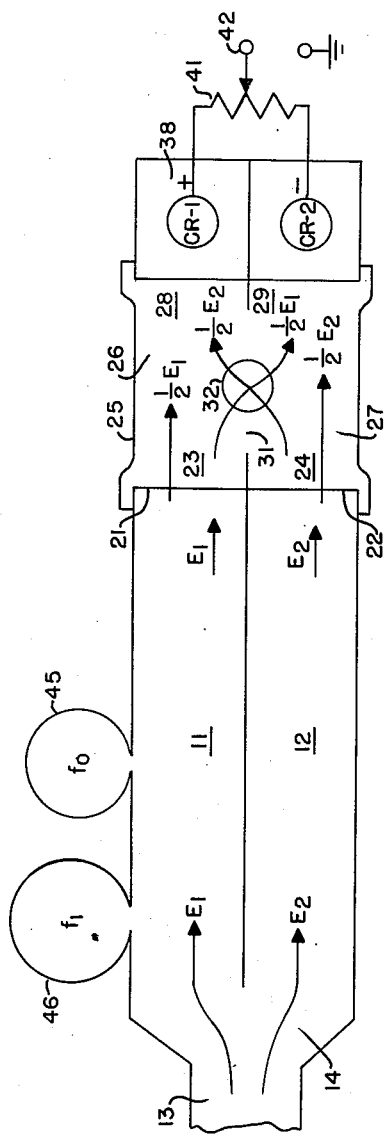
Fig. 4 is a diagrammatic-schematic view illustrating a modification of the discriminator apparatus disclosed in Fig. 1.

With reference now to the drawing, and more particularly to Fig. 1 thereof, the frequency discriminator of this invention is seen to include a pair of adjacent parallel rectangular waveguide transmission channels 11 and 12 having a common waveguide input 13 coupled to transmission channels 11 and 12 by a microwave power dividing section 14. Transmission channels 11 and 12 may most conveniently be fabricated from commercial waveguide for the frequencies employed in the system. Thus, if the microwave input is expected to lie in X-band, rectangular waveguide as normally used in X-band transmissions may be used. As shown in the drawing two such waveguide sections may be placed in parallel with a common side wall to form an appropriate structure.

By virtue of the symmetry involved, microwave signals applied to input 13 are divided equally in transit through section 14, with the result that radiations herein designated as microwave signals $E_1$ and $E_2$, substantially identical in phase and amplitude, are applied respectively to transmission channels 11 and 12.

As is illustrated a tunable cavity resonator 18 is shunt-coupled to transmission channel 11 through an opening in the side wall of the respective waveguide. Accordingly, resonator 18 controls the phase shift of energy $E_1$ transmitted through channel 11 with respect to the energy $E_2$ transmitted in channel 12. If the microwave energy input at 13 is precisely equal to the reference cavity frequency designated as $f_0$, then the relative phase difference at the outputs 21 and 22 of the parallel channels 11 and 12 will be precisely zero. However, when the frequency of the input signal at 13 is below the frequency of the reference cavity 18, the effect of the cavity is to introduce a phase lead into energy $E_1$, whereby the energy output at 21 will exhibit a phase lead relative to the energy output at 22. Conversely, when the input signal frequency is above that set by reference cavity 18, the microwave output at 21 will lag the phase of the output at 22. The extent of the phase lag or lead of the signal transmitted through channel 11 will, of course, be dependent upon the frequency deviation of the input from the frequency established by cavity resonator 18.

The signal outputs of channels 11 and 12 are applied at 21 and 22 respectively to the input arms 23 and 24 of a ninety degree phase shift power dividing coupler 25. Generally speaking, it is the function of this coupler to divide the signal applied at each input arm thereof into two portions, one of which is retarded ninety degrees in phase with respect to the other. As illustrated in Fig. 1, this energy division and phase shift relationship is achieved by utilizing the well-known short slot hybrid junction of the type disclosed in detail in Patents 2,739,287 and 2,739,288 of Henry J. Riblet. Basically, this coupled, as shown in Fig. 1, consists of a pair of parallel adjacent waveguides 26 and 27 having the input arms 23 and 24, and having axially opposite output arms 28 and 29. The common narrow wall between guides 26 and 27 is formed with an aperture 31 and a pair of symmetrical, confronting capacitive loading domes, the lower one of which is shown at 32. Inwardly facing side wall indentations 33 and 34 are used to suppress undesired higher order modes in the apertured region of the hybrid junction.

As has been fully described in the cited Riblet patents, this hybrid junction, throughout the relatively broad operating frequency spectrum, offers the characteristic that energy applied to one of the input arms is equally divided between the two output arms, with substantially complete isolation of the opposite input arm. By virtue of the geometry of the device the equal microwave outputs of the two output arms are in phase quadrature.

In Fig. 1 the power dividing characteristics of coupler 25 are illustrated diagrammatically in that the excitation $E_1$ applied at output 21 of transmission channel 11 is shown to be divided into two signals, each represented as $\frac{1}{2}E_1$, appearing in the output arms 28 and 29 of the coupler. Of the energy $E_1$ thus divided, the fraction which appears in output arm 29 lags that which appears in output arm 28 by ninety degrees. Substantially complete isolation exists between input arms 23 and 24 due to the inherent properties of the coupler.

By virtue of the reciprocal action of coupler 25, the excitation $E_2$ applied at the output 22 of transmission channel 12 is equally divided and appears as excitations $\frac{1}{2}E_2$ in each of the coupler output arms 28 and 29; the excitation in output 28 lagging the excitation at output 29 by ninety degrees.

As further illustrated in Fig. 1, the cross coupled radiations appearing in the output arms 28 and 29 are applied to a pair of microwave detectors CR-1 and CR-2, both of which are preferably silicon or germanium diodes, located in a dual waveguide short-circuited termination section 38. Detectors CR-1 and CR-2 are arranged to be sensitive to signals of opposite polarity; that is to say, CR-1, for example, detects the positive electromagnetic peaks of microwave energy incident thereon, while CR-2 detects negative peaks of waves applied thereto. The simple summing circuit which consists of potentiometer 41 provides a signal $C_0$ at output terminal 42 which has the desired discriminator characteristic.

It should be observed at this point that as an alternative detectors CR-1 and CR-2 may be arranged to be sensitive to radiations of like polarity in which case a combining circuit in the form of a simple subtractor may be used to provide the output $e_0$. Further, it would be possible to use other means of amplification and detection, such as a superheterodyne circuit, travelling wave tube or the like, followed by appropriate amplitude detectors to provide signals which can be combined to yield the discriminator output.

The phase relationships of electromagnetic energy in the microwave discriminator illustrated in Fig. 1 are depicted for various frequencies by the vector diagrams shown in Fig. 2.

Referring now to Fig. 2A and Fig. 2B, the vector relationships for the signal inputs to the detectors CR-1 and CR-2 respectively are illustrated for the specific condition when the microwave input at 13 in Fig. 1 is precisely at the resonance frequency $f_0$ of tunable cavity 18. More specifically, Fig. 2A indicates that the excitations applied to detector CR-1 comprise vectors $\frac{1}{2}E_1$ and $\frac{1}{2}E_2$ lagging by ninety degrees. The vector sum is the input to CR-1. The components applied to CR-2, Fig. 2B, are made up of vectors $\frac{1}{2}E_2$ and $\frac{1}{2}E_1$ lagging by ninety degrees. The resultant is the input to CR-2. In these drawings, both vectors $\frac{1}{2}E_1$ and $\frac{1}{2}E_2$ are shown as equal in amplitude. In fact, however, $\frac{1}{2}E_1$ would be less in magnitude than $\frac{1}{2}E_2$ due to absorption in resonator 18. But since this amplitude difference will be equal at both detectors, there is no effect on the equality of the resultants.

It is at once evident then that the two vector sums in Fig. 2A and Fig. 2B are precisely equal due to the amplitude equality and symmetrical phase relationships of the respective vector components; hence the difference in the outputs of detectors CR-1 and CR-2 as provided by potentiometer 41 in Fig. 1, will be zero.

Fig. 2C and Fig. 2D illustrate the vector relationships in the event that the input signal input at 13 in Fig. 1 is less than the frequency $f_0$ of the cavity resonator 18. The vectors $\frac{1}{2}E_2$ emanating from transmission channel 12 remain unchanged in relative phase. However, the two vectors $\frac{1}{2}E_1$ derived from channel 11 are, due to the coupling of cavity resonator 18, advanced in phase by an angle related to the deviation in frequency. It is thus seen that the input to detector CR–2 exceeds the vector sum of signals applied to detector CR–1; accordingly, an output signal $e_0$ of a particular polarity is derived. Vector diagrams Fig. 2E and Fig. 2F illustrate the converse effect which occurs when the frequency of the microwave input at 13 in Fig. 1 is greater than the resonance frequency $f_0$ established by cavity 18. Under these circumstances the input to detector CR–1 exceeds the combined input to detector CR–2, a signal $e_0$ of opposite polarity being obtained on taking the difference.

The vector diagrams of Fig. 2 illustrate an important feature of the invention, namely that at all times, each detector is operating under at least a signal equal to $\frac{1}{2}E_2$ in the region of control. This has the advantageous effect of improving the linear relationship between the output signal and the frequency deviation.

The variation of the signal output $e_0$ as a function of frequency is graphically depicted by the solid line in Fig. 3. Thus, $e_0$ is of zero magnitude at frequency $f_0$, while about this point, the signal rises and falls in typical discriminator fashion.

Fig. 4 diagrammatically illustrates an alternative configuration of the discriminator previously discussed in connection with Fig. 1, like reference numerals being employed to identify similar components. As illustrated, a plurality of cavity resonators, such as 45 and 46, which may be independently tunable, are series- or shunt-coupled to the transmission channel 11. The effect is to provide a corresponding plurality of resonances, each independent of the other, about which frequency deviation may be detected. Resonators 45 and 46 may, however, be of precisely the same frequency but of high and low Q respectively. The discriminator pattern obtained by such combination of resonances is illustrated by the broken line in Fig. 3, the frequency $f_0$ being assumed to be the resonant frequency of each of the two cavities.

Figure 5:
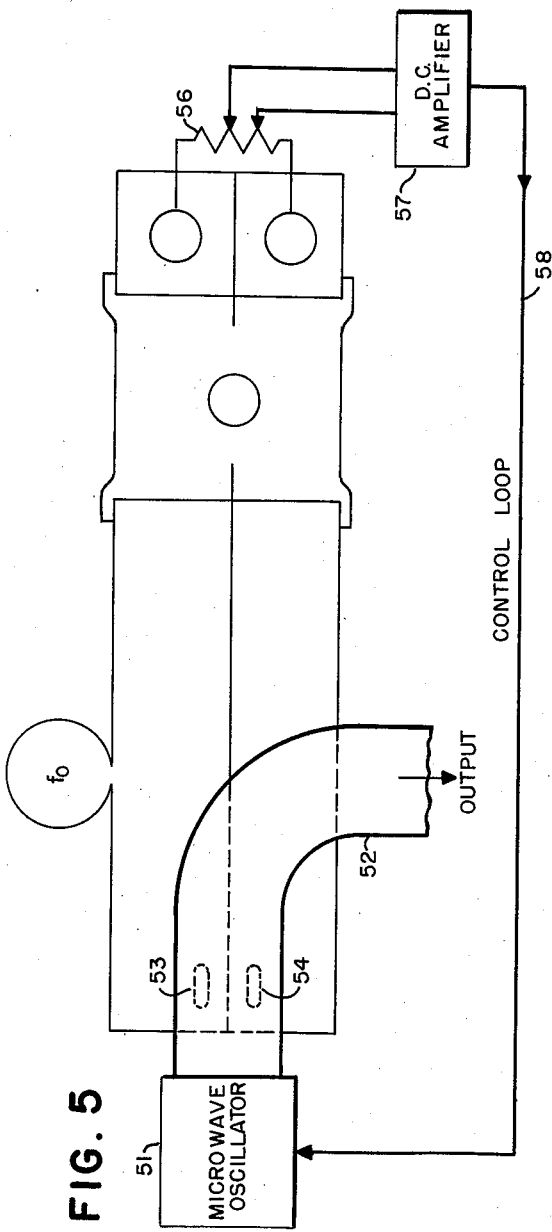
Fig. 5 is a diagrammatic-block diagram illustrating the use of the discriminator of the present invention in the stabilization of the frequency of a microwave source.

Fig. 5 diagrammatically illustrates the frequency discriminator of this invention in use as a means for stabilizing a source of microwave oscillation. As illustrated, the microwave oscillator 51 provides an output which is coupled through curved waveguide section 52 to a utilization circuit (not shown). A small fraction of the oscillator output may be coupled to the discriminator waveguide input as 13 in Fig. 1, or as shown in Fig. 5. Small equal amounts of the energy output of oscillator 51 may be introduced into the transmission channels 11 and 12 through a pair of longitudinal coupling slots 53 and 54 respectively. The outputs of oppositely poled detectors CR–1 and CR–2 are summed by a potentiometer 56 having a pair of taps which furnish the input to a D.C. amplifier 57.

The discriminator output thus amplified is applied over a degenerative feedback loop 58 to a frequency controlling electrode of the microwave oscillator 51. Thus, if the microwave oscillator 51 constitutes a conventional klystron tube, the control loop 58 may be used to apply a correction signal to the klystron repeller electrode. This closed, stabilized loop will accordingly maintain the klystron frequency at $f_0$, the resonant frequency of tunable cavity 18.

In the operation of the frequency discriminator previously discussed in connection with Fig. 1, it may become necessary to compensate for actual differences in the transmission factors of the microwave components resulting, for example, from a lack of precise symmetry, or from a mismatch of the detectors CR–1 and CR–2. To effect such adjustment, the frequency of cavity resonator may be detuned relative to the frequency of the microwave input, for example, to a point such as $f_a$ in Fig. 3. With the discriminator so widely detuned, the discriminator output $e_0$ should be zero. If not, adjustment to zero may be accomplished by trimming potentiometer 41 to a balance point which provides zero output. Thereafter, when the frequency of the cavity resonator is returned to the region of the microwave input at 13, a balanced discriminator characteristic will be achieved. Similarly, in Fig. 5 the taps on potentiometer 56 allow adjustment to compensate for minor differences in the detection efficiencies of CR–1 and CR–2 and also for slight imperfections and asymmetries in the microwave coupling circuits.

As previously discussed in connection with Fig. 1, the principal advantage of the short slot hybrid junction of the Riblet type illustrated is that it provides equal power division with a ninety degree phase shift over a relatively broad microwave spectrum, thus permitting broad tuning of the resonance point $f_0$ of cavity resonator 18. However, it will be understood that other microwave components capable of providing a like power and phase distribution of incident energy are equally well suited to this discriminator. For example, for the short slot hybrid junction, a top wall waveguide junction or a multi-slot coupler may be substituted, so long as these meet the design criteria in respect of power division and phase. Through the use of such microwave geometries, a discriminator pattern which is independent of the frequency of operation is achieved together with intrinsic balance while the need for phase and amplitude adjustment in the operating region is avoided.

In Figs. 1, 4 and 5 series- and shunt-coupled cavity resonators with only one coupling iris were illustrated. It will be appreciated however that a transmission resonator with input and output irises may be used, subject however to an adjustment so that the path lengths through transmission channels 11 and 12 provide equiphase inputs to the power dividing coupler at frequency $f_0$. Otherwise design and operation are as for the shunt cavity.

In order to change the reference frequnecy of the device it is only necessary to tune the resonant cavity. No further adjustments in the transmission channels or in the detectors, after initial balance, are required. The microwave components illustrated are of inherently low loss resulting in a discriminator of relatively high efficiency.

Modifications and improvements of the discriminator techniques herein described may now become obvious to those skilled in the art. It will be understood therefore that the scope of the present invention is to be regarded as subject only to those limitations of the appended claims.

What is claimed is:

1. A microwave discriminator comprising, first and second microwave transmission channels having a common power dividing input for dividing microwave input power into substantially in-phase portions in said first and second transmission channels, means coupled to said first transmission channel for shifting the phase of microwave energy therein as a function of frequency, a first detector providing an output proportional to the sum of a portion of the microwave signal of said first channel and a phase shifted portion of the microwave signal of said second channel, a second detector providing an output proportional to a portion of the signal of said second transmission channel and a phase shifted portion of the signal of said first transmission channel, and means for combining the outputs of said first and second detectors.

2. Frequency discriminator apparatus in accordance with claim 1 wherein said phase shifts are ninety degrees.

3. Frequency discriminator apparatus in accordance with claim 1 wherein said detectors are oppositely poled and the outputs thereof additively combined to provide the output of said discriminator.

4. A microwave discriminator comprising first and second waveguide channels having a common power dividing input for dividing microwave input power into substantially in-phase portions in said first and second transmission channels, a cavity resonator coupled to one of said waveguide channels, a first detector providing an output proportional to the sum of one-half the signal of said first channel and one-half the signal of said second channel retarded ninety degrees, a second detector providing an output proportional to one-half the signal of said second channel and one-half the signal of said first channel retarded ninety degrees, and means for differentially combining predetermined fractions of said outputs of said first and second detectors.

5. A microwave discriminator in accordance with claim 4 wherein said common input divides input signals applied thereto into microwave signals of equal amplitude in said first and second waveguide channels.

6. Apparatus for detecting the frequency deviation of a microwave input signal within a predetermined frequency band from the frequency of a cavity resonator comprising, first and second microwave transmission channels having a common input, means for applying said microwave signal to said common input to provide signals of equal amplitude and phase in said first and second channels, means coupling said cavity resonator to one of said transmission channels, means for detecting the combination of one-half the signal of said first channel and one-half the signal of said second channel phase shifted ninety degrees in one direction, means for detecting the combination of one-half the signal of said second channel and one-half the signal of said first channel phase shifted ninety degrees in like direction, and means for combining the outputs of said detecting means.

7. Apparatus for detecting the frequency deviation of a microwave input signal within a predetermined frequency band from the frequency of a cavity resonator comprising, first and second microwave transmission channels having a common input, means for applying said microwave signal to said common input to provide signals of equal amplitude and phase in said first and second channels, means coupling said cavity resonator to one of said transmission channels, means for detecting the combination of one-half the signal of said first channel and one-half the signal of said second channel phase shifted ninety degrees in one direction, means for detecting the combination of one-half the signal of said second channel and one-half the signal of said first channel phase shifted ninety degrees in like direction, a potentiometer for combining the outputs of said detecting means, the output of said potentiometer being adjusted to zero signal in a frequency range beyond said microwave frequency band.

8. A microwave discriminator comprising first and second waveguide transmission channels, means for dividing input power into substantially equal amplitude in phase components in said first and second transmission channels, a short slot microwave hybrid junction having two input and two output arms, means coupling the outputs of said first and second waveguide channels respectively to said hybrid junction input arms, first and second microwave detectors respectively energized from said hybrid junction output arms, means for combining the outputs of said first and second microwave detectors, and means for altering the phase of microwave signals in said first waveguide channel as a function of frequency thereof.

9. Discriminator apparatus as in claim 8 wherein said last mentioned means comprises a tunable cavity resonator.

10. A microwave discriminator comprising, first and second substantially parallel rectangular waveguide transmission channels having a common narrow wall, an input rectangular waveguide section, a power dividing waveguide section coupling said input section to said first and second waveguide channels and having the characteristic of dividing input power to said discriminator into substantially equal amplitude in phase components in said first and second waveguide channels, a tunable resonant cavity coupled to said first rectangular waveguide channel through a narrow wall thereof, a short slot microwave hybrid junction having first and second inputs respectively energized from said first and second waveguide channels, first and second oppositely poled microwave detectors respectively energized from the outputs of said short slot hybrid junction, and a potentiometer for additively combining the outputs of said first and second microwave detectors.

11. Apparatus for providing frequency stabilized microwave signals comprising a microwave oscillator having a voltage sensitive frequency control element and a microwave output transmission channel, first and second waveguide channels having a power dividing input, means coupling a small fraction of the output of said microwave oscillator from said output transmission channel to said common power dividing input, said common power dividing input having the characteristic of dividing input power thereto into substantially equal amplitude in phase components in said first and second waveguide channels, a cavity resonator coupled to one of said waveguide transmission channels, a first detector providing an output proportional to the sum of one-half the signal of said first waveguide channel and one-half the signal of said second waveguide channel phase shifted ninety degrees, a second detector providing an output proportional to one-half the signal of said second waveguide channel and one-half the signal of said first waveguide channel phase shifted ninety degrees, means for combining predetermined fractions of said outputs of said first and second detectors to provide a control signal, and a feedback loop for applying said control signal to said microwave oscillator frequency control element.

12. Apparatus in accordance with claim 11 wherein said combining means comprises a potentiometer energized by said first and second detectors and including at least one tap furnishing said control signal.

13. A microwave discriminator in accordance with claim 8 wherein said last mentioned means comprises a plurality of tunable cavity resonators.

14. A microwave discriminator in accordance with claim 8 wherein said last mentioned means comprises at least two cavity resonators having different resonant frequencies.

15. A microwave discriminator in accordance with claim 8 wherein said last mentioned means comprises a plurality of cavity resonators resonant at substantially the same frequency, said cavity resonators having different values of Q.

16. A microwave discriminator in accordance with claim 10 and including at least a second resonant cavity coupled to said first rectangular waveguide transmission channel through said narrow wall thereof.

References Cited in the file of this patent

UNITED STATES PATENTS

| 2,691,734 | Beck et al. | Oct. 12, 1954 |
| 2,726,333 | Pritchard | Dec. 6, 1955 |